United States Patent [19]
De Lange

[11] Patent Number: 5,612,863
[45] Date of Patent: Mar. 18, 1997

[54] SORTING SEQUENTIAL DATA PRIOR TO DISTRIBUTION OVER PARALLEL PROCESSORS IN RANDOM ACCESS MANNER

[75] Inventor: Alphonsius A. J. De Lange, Eindhoven, Netherlands

[73] Assignee: U.S. Philips Corporation, New York, N.Y.

[21] Appl. No.: 383,392

[22] Filed: Feb. 3, 1995

[30] Foreign Application Priority Data

Feb. 4, 1994 [EP] European Pat. Off. ............. 94200333

[51] Int. Cl.⁶ .................................................. G06F 15/00
[52] U.S. Cl. .................... 364/134; 395/163; 395/164; 395/800; 395/502; 395/507
[58] Field of Search ................................. 364/131–134; 395/800, 162–164, 312; 382/304, 307

[56] References Cited

U.S. PATENT DOCUMENTS

| | | |
|---|---|---|
| 4,521,874 | 6/1985 | Rau et al. . |
| 5,103,311 | 4/1992 | Sluijter . |
| 5,197,140 | 3/1993 | Balmer ................................. 395/800 |
| 5,293,481 | 3/1994 | Mita et al. .............................. 395/163 |
| 5,315,700 | 5/1994 | Johnston et al. ....................... 395/163 |

OTHER PUBLICATIONS

1981 IEEE Computer Society Workshop on Computer Architecture for Pattern Analysis and Image Database Management, Hot Springs Virginia, Nov. 11–13, 1981, pp. 104–111, W.H. Tsai et al.

*Primary Examiner*—Roy Envall
*Assistant Examiner*—Steven R. Gorland

[57] ABSTRACT

A data processing system comprises a plurality of processing elements being operative to process data and being coupled in parallel to a bus via a control means that governs data communication. The control means comprises a plurality of buffer means, and each respective one of the buffer means includes a respective plurality of parallel buffer segments. The control means is operative to selectively connect a single one of the buffer segments in respective ones of the buffer means to respective ones of the processing elements. This effectively permits distributing of the data in an arbitrary manner over the elements by the sorting the data in advance in the segments according to destination. The system is highly suitable to handle video and graphics data in image synthesis.

7 Claims, 5 Drawing Sheets

SORTING SEQUENTIAL DATA PRIOR TO DISTRIBUTION OVER PARALLEL PROCESSORS IN RANDOM ACCESS MANNER

FIELD OF THE INVENTION

The invention relates to a data processing system comprising data port means; a plurality of processing elements being operative to process sequential data and being coupled in parallel to the data port means; and control means coupled between the processing elements and the data port means for governing data communication.

BACKGROUND ART

One of the bottlenecks of high-speed data processing is the interface between separate data processing units, such as between memories and CPUs. This interface is an essential pathway in the entire processing system, as it is responsible for carrying an incessant flow of program instructions and data. Parallel processing increases speed on the one hand, but may introduce time-management problems on the other hand in regard to proper distribution of data, dependent on the specific data processing task.

A system that supports a parallel architecture as presented in the preamble is known from U.S. Pat. No. 5,103,311 (PHN 12,376). This reference discloses a processor system for processing video samples on a real-time basis in a modular and hierarchical architecture. The system has at least one processor unit that in turn has at least one module with a plurality of processing elements. The elements operate in parallel and are connected to a cross-bar switch for the appropriate routing of the input signals to the elements of the module and of the output signals from the elements. Each switch point of the cross-bar switch preferably is provided with a register to solve conflicts that may arise from simultaneous access requests to the same processor element. There is a fixed relationship between the sample frequency and the clock frequency at all levels in the system.

Another system of the type mentioned in the preamble is known from U.S. Pat. No. 4,521,874 and concerns an interconnect cross-bar matrix with additional memory elements at interconnect nodes. Distribution Of the memory elements facilitates the operation and programming of a parallel-processor structure. The storage protocol per element is based on consolidation, i.e, re-compaction of the stored data items in functionally contiguous memory locations after a particular data item has been purged from the memory upon reading. This data re-compaction requires additional circuitry. Also, the data re-compaction sets an upper limit to the operation speed, since it requires additional time between the execution of a last-read instruction and the execution of a next write instruction. Accordingly, this system is not suitable to process video signals on a real-time basis.

OBJECT OF THE INVENTION

In the prior art systems, each processing element is connected to a specific I/O channel via a cross-bar switch for a limited time interval. Next, another processing element is switched to the same I/O channel. The first element has to wait for being connected to said I/O channel until the other element(s) have been served by the same channel. The known systems are suitable for handling blocks of consecutive data as in video processing, or for processing data at a rate lower than real-time. The prior art systems are not adapted to process data that are distributed over the processing elements in an arbitrary manner or on a random-access basis.

It is an object of the invention to provide a data processing system with a parallel architecture wherein the data can be distributed over the processing elements in an arbitrary manner without hampering the high processing speed.

SUMMARY OF THE INVENTION

To this end, the invention provides a data processing system as specified in the preamble characterized in that the control means comprising a further plurality of buffer means, each respective one of the buffer means including a respective plurality of parallel buffer segments. The control means is operative to selectively connect a single one of the buffer segments in respective ones of the buffer means to respective ones of the processing elements.

Consider an architecture with a first and a second processing element and first and second buffer means. When the first processing element is switched from the first buffer means to the second buffer means and the second processing element is connected to the first buffer means, the data channel through the first buffer means is not available anymore to the first processing element. This is similar to what happens in above prior art systems. In the invention, however, the second buffer means has parallel buffer segments and one of these is controlled to take over the previous role of the first buffer means as far as communication with the first processing element is concerned. The data supplied via the data port means therefore are sorted in advance according to their destination.

In effect, the data port means is communicating with a specific processing element each time through a different one of a collection of respective buffer segments that are located in respective ones of the buffer means, while only a single one of the buffer means at a time can be connected to a particular processing element. The architecture of the invention avoids idling of the processing elements and inaccessibility of data by pipelining. The system in the invention permits a highly modular architecture. The architecture allows for a bi-directional data communication between the processing elements and the data port means.

Note that speed is determined by the number M of processing elements and the access rate V of a processing element. The maximum average through-put of the architecture then is M times V equals MV. Increasing the number of elements proportionally increases the through-put.

In a first embodiment, the system comprises a bus for connecting the buffer means in parallel to the data port means, and the control means are operative to selectively connect the buffer segments to the bus. Thus the control means governs the data paths both from the data port means to the buffer segments and from the buffer segments to the processing elements. The control means may include, for example, a controller whose microcode implements the scheduling of the interconnections between the processor elements and the buffer segments.

In a second embodiment, the system comprises first and second buses for transport of sequential data at a first rate and a second rate, respectively, between the data port means and at least a first one of the buffer means and a second one of the buffer means, respectively. The difference in transport rates is invisible to the processing of the data by the processing elements.

The buffer segments of the first buffer means preferably have a first depth, and the buffer segments of the second buffer means have a second depth different from the first. As the buffer segments for buffering the data corresponding to the higher one of the rates have to receive and to furnish more data items per unit time than the buffer segments for the lower rate data, the latter need less buffer capacity than the former.

The control means may include, for example, a controller whose microcode implements the scheduling of the interconnections between the processor elements and the buffer segments, and between the buffer segments and the data port means.

In a specific embodiment, respective ones of the processing elements may comprise a respective memory unit, e.g., a random access memory (SRAM, DRAM). The system in the invention is suitable for high-speed image processing and combining video data and graphics data in an arbitrary pixel-by-pixel configuration due to the random access option. Preferably, the random access memory includes a page-mode DRAM to handle raster-scan image video and/or graphics data. Note that the sorting and buffering operations are completely transparent to the user of the system, and that neither random-access operation nor raster-scan access operation require wait states.

The segmentation of each of the buffer means into parallel buffer segments can be repeated, i.e., the buffer segments themselves can again be segmented at the next lower organizational level, thus providing a hierarchical buffer segment architecture for high speed data routing.

DESCRIPTION OF THE DRAWINGS

The invention is explained in further detail by way of example and with reference to the accompanying drawing, wherein.

Throughout the drawing, similar or corresponding features are indicated by identical reference numerals.

DESCRIPTION OF THE PREFERRED EMBODIMENT

First example

Figure 1:
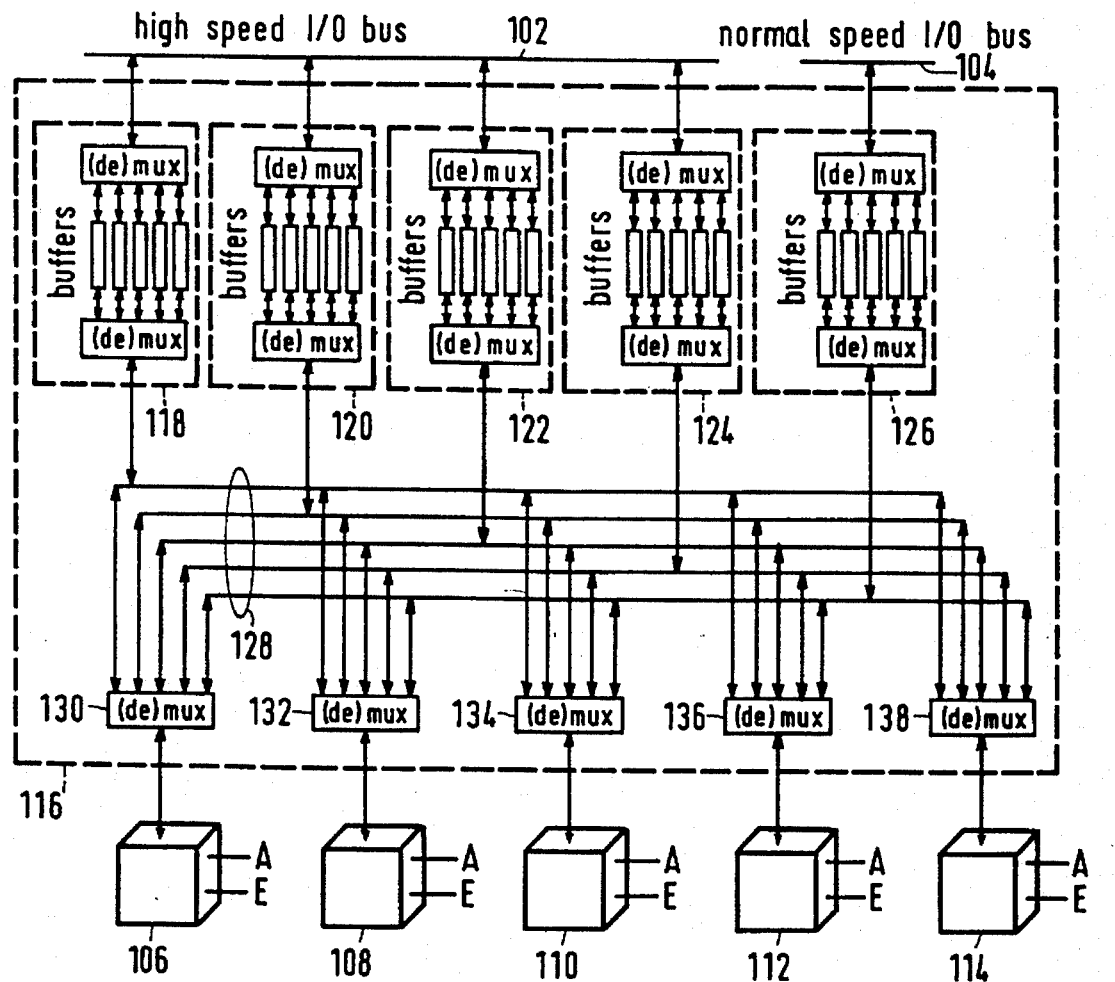
FIGS. 1 and 2 give block diagrams illustrating a first example of a system in the invention.

FIG. 1 illustrates a first example of a data processing system 100 according to the invention. In this example, system 100 is part of an image processing system. System 100 comprises a high-speed I/O bus 102, e.g., for the transport of video data, and a normal speed I/O bus 104, e.g, for the transport of graphics data. System 100 incorporates a plurality of data processing elements 106, 108, 110, 112 and 114. In this example, processing elements 106-114 each include a respective memory, preferably a DRAM having a page-mode. Control inputs "A" and "E" indicate "Address" and "Enable read/write", respectively. System 100 further is comprised of a control means 116 that governs the data communication between buses 102–104 and memories 106–114.

In regard to this example concerning image processing, it is known to organize a random access memory into several banks such as 106–114 to increase storage capacity and access speed. The speed per bank can be reduced when applying bank-switching techniques.

Control means 116 comprises a plurality of buffer means 118, 120, 122, 124 and 126, a plurality of intermediate parallel buses 128, and a plurality of (de)multiplexers 130, 132, 134, 136 and 138. Buffer means 118–124 are connected in parallel to I/O bus 102, and buffer means 126 is connected to I/O bus 104. Each respective one of buffer means 118–126 is coupled to a respective one of intermediate buses 128. Each respective one of (de)multiplexers 130–138 is connected to a respective one of memories 106–114, and to all of intermediate buses 128.

Figure 2:
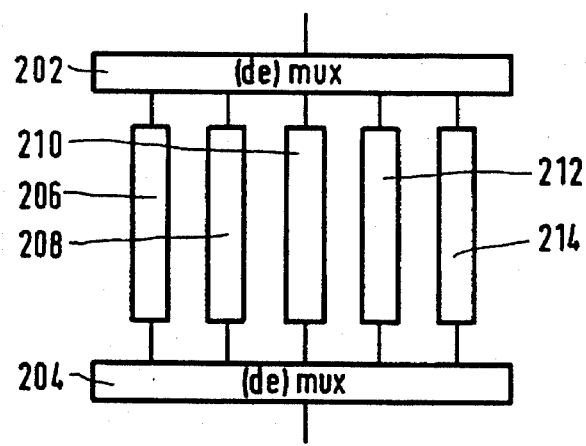

For the sake of clarity, FIG. 2 shows a single one of buffer means 118–126 in greater detail. Buffer means 118–126 are functionally identical and each respective one of buffer means 118–126 comprises a respective plurality of buffer segments arranged in parallel between a respective pair of further (de)multiplexers. The buffer means of FIG. 2 includes a (de)multiplexer 202 for connection to I/O bus 102, a (de)multiplexer 204 for connection to a particular one of intermediate buses 128, and a plurality of buffer segments 206, 208, 210, 121 and 214 arranged in parallel between (de)multiplexers 202 and 204. Buffer segments 206–214 can be bi-directional in order to handle the data flow from buses 102 and 104 to memories 106–114 and vice-versa.

The (de)multiplexers 130, 132, 134, 136, 138, 202 and 204 are controlled by a controller (not shown) whose microcode implements the scheduling of the interconnections between memories 106–114 and the buffer segments 206–214 in buffer means 118–126, and between buffer segments 206–214 and buses 102 and 104.

When there is a data flow from buses 102–104 to memories 106–114, (de)multiplexers 202 of buffer means 118–126 serve to guide the data from buses 102 and 104 to an appropriate one of buffer segments 206–214, thus performing the sorting according to destination of the data. The (de)multiplexers 204 and 130–138 are used to merge the data streams from the buffer segments into sorted streams of data for each of the destinations, i.e., for each of the memories 106–114. Each respective one of internal buses 128 communicates data between a specific one of buffer segments 206–214 in a respective one of buffer means 118–126 and a respective one of memories 106–114.

Preferably, performance is increased by using so-called page-mode DRAMs for memories 106–114. In a DRAM, access of each cell is accomplished by providing the associated row address and column address. An address strobe latches each of the addresses into the DRAM's internal registers for subsequent decoding. Both row address and column address share the same input lines, so the DRAM requires two distinct strobes to identify which of the addresses is presented. These strobes are called row-address strobe (RAS) and column address strobe (CAS), whose relative timing governs DRAM operation. A DRAM having a page-mode permits accessing any number of cells of the same row with only one application of the row address. Keeping RAS valid, subsequent accesses are accomplished by strobing-in the appropriate column addresses. Thus, RAS cycles are avoided as long as cells of a single row are involved. Here, performance is limited by the DRAM's cycle time, including CAS recovery time, and the ratio of successive data retrieved from the same row and successive data retrieved from different rows.

Second example

Figure 3:
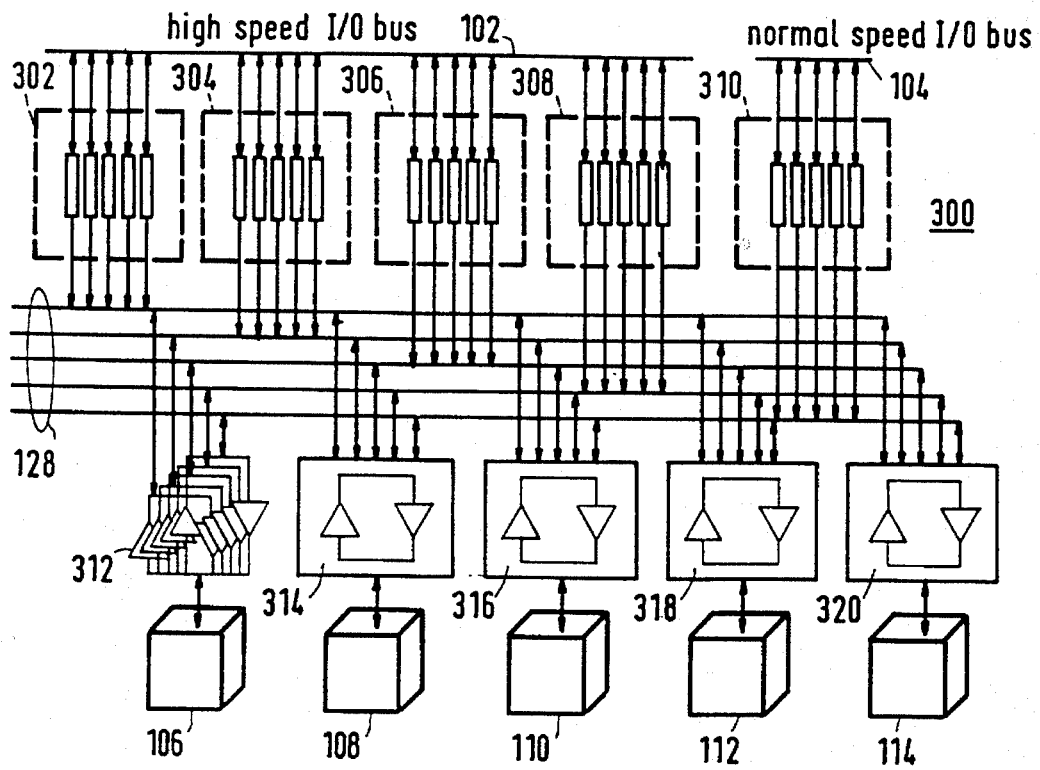
FIGS. 3–7 give block diagrams of further examples of a system in the invention.

FIG. 3 gives a block diagram of a second example of a system 300 in the invention. In contrast with system 100 discussed under FIGS. 1 and 2, system 300 does not use separate (de)multiplexers such as 202, 204 and 130–138. Instead, system 300 comprises segmented buffer means 302, 304, 306, 308 and 310, each respective one thereof being arranged between a respective one of intermediate buses 128 and I/O bus 102 or 104. Each of segmented buffer means 302–310 includes access control logic and tri-state output drivers (not shown here). In addition, system 300 employs further tri-state drivers 312, 314, 316, 318 and 320 between intermediate buses 128 and processing elements 106–114 to avoid short circuiting of internal buses 128. Drivers 312, 314, 316, 318 and 320 and the access control logic of segmented buffer means 302, 304, 306, 308 and 3 10 is controlled via a controller (not shown) with an appropriate microcode program.

Third example

Figure 4:
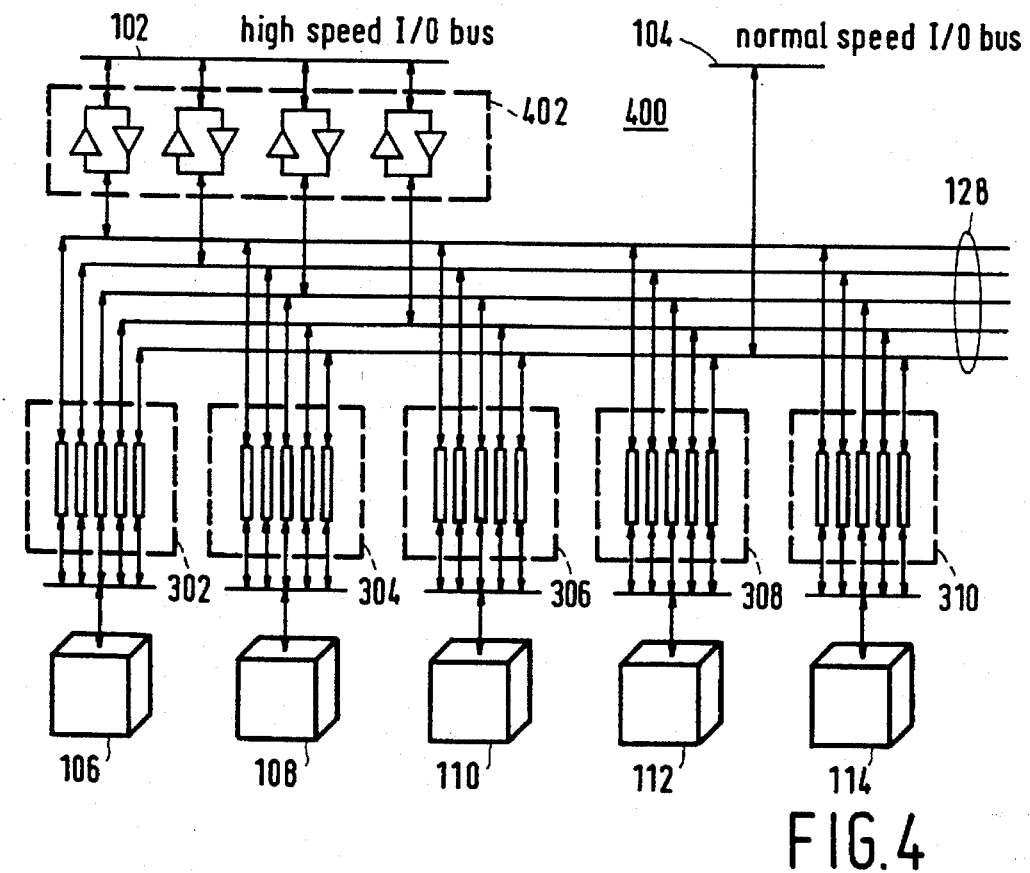

FIG. 4 is a block diagram of a third example of a system 400 in the invention. Systems 100 and 300 can also be operated as bi-directional systems. That is, data can be transported from buses 102 and 104 to processing elements 106–114 (e.g., memories) as well as from elements 106–114 to buses 102 and 104. Accordingly, processing elements 106–114 and buses 102 and 104 can be interchanged as regards their function as source of data and destination for data. This is reflected by system 400, whose architecture is in principle inverted with regard to that of system 300 in FIG. 3. Now, each specific one of segmented buffer means 302–310 couples a specific one of processing elements 106–114 to all internal buses 128.

Four of the five internal buses 128 are coupled to high-speed bus 102 via a plurality of bi-directional tri-state bus drivers 402, the fifth internal bus is directly coupled to normal-speed bus 104. Since there are a multitude of internal buses 128 coupled in parallel to bus 102, drivers 402 are required to prevent the internal buses from being short-circuited among one another. The drivers are controlled via a controller (not shown) with an appropriate microcode program.

Fourth example

Figure 5:
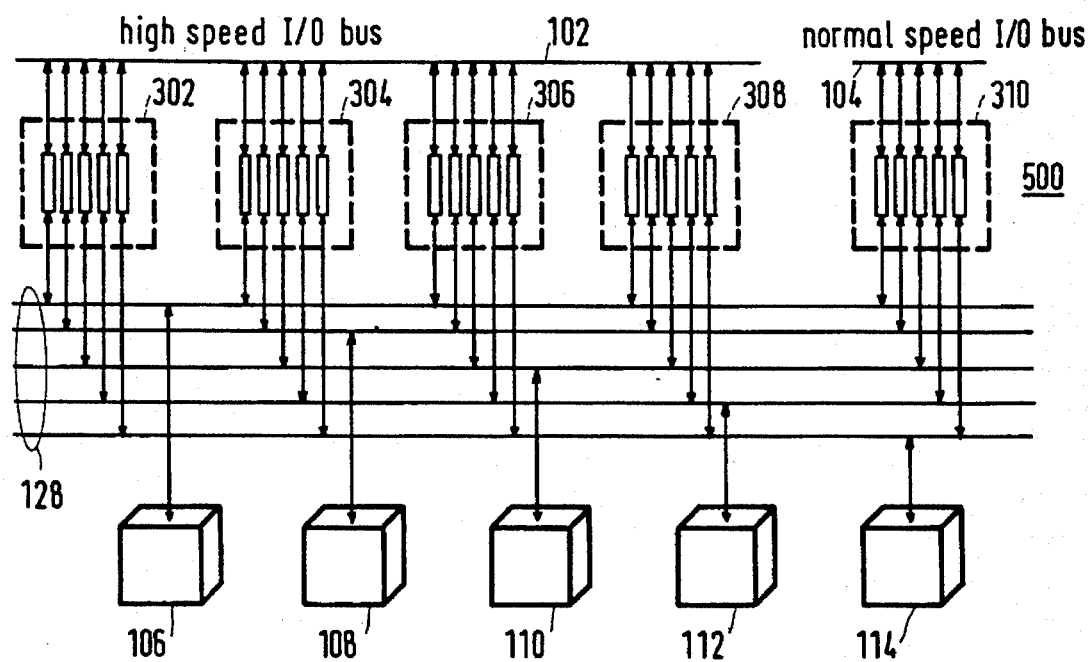

FIG. 5 gives a fourth example of a system 500 in the invention. The architecture of system 500 is a further development of systems 300 and 400, discussed above, by considering the active data paths in the network and the concurrent communication between respective ones of processing elements 106–110 and respective ones of the buffer segments of buffer means 302–310. Each one of internal buses 128 in system 300 and 400 carries data from a single one of the parallel buffer segments, located in segmented buffer means 302–310 to a single one of processing elements 106–114 (and vice versa when elements 106–114 are, e.g., memories). Therefore, a re-arrangement of the interconnection structure results in system 500, wherein in each specific one of segmented buffer means 302–310 a respective buffer segment now is connected between a respective one of internal buses 128 and I/O bus 102 or 104.

Fifth example

Figure 6:
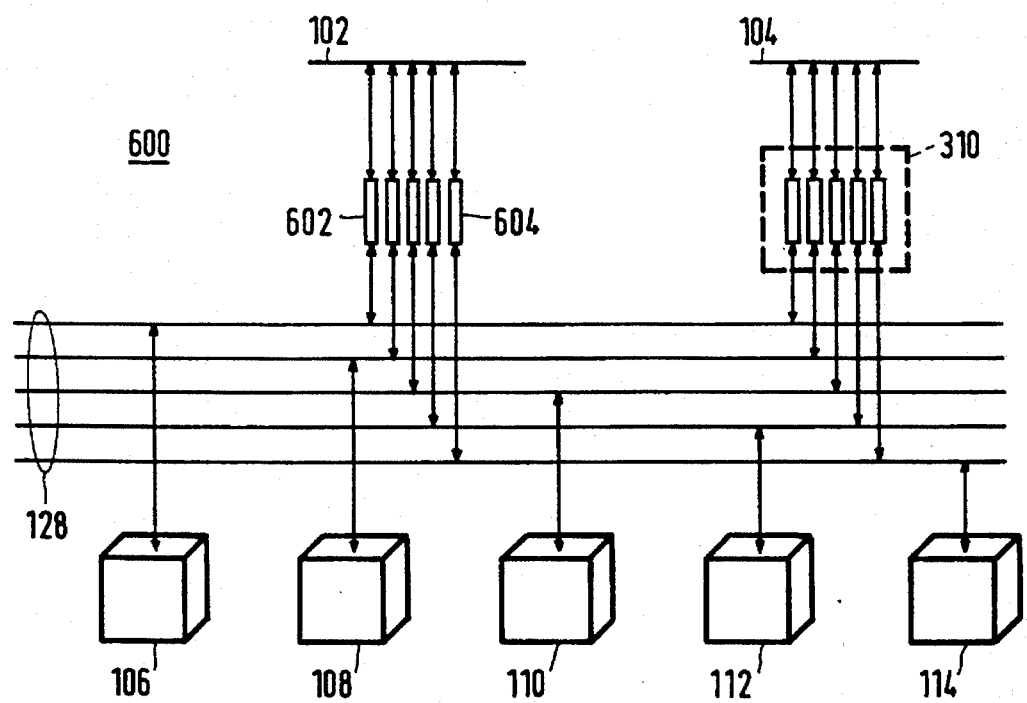

FIG. 6 gives a fifth example of a system 600 in the invention, being a further development from system 500 discussed above. A further optimization could be achieved by merging some or all of the buffer segments that are distributed over different ones of buffer means 302–310 and that are effectively arranged in parallel to one another in that they are connected to the same one of intermediate buses 128. For example, the buffer segments that are connected between bus 102 and a particular one, say the upper one, of intermediate buses 128 in FIG. 5, are merged with one another to form a single aggregate buffer segment 602 in system 600. Similarly, the buffer segments that are connected between bus 102 and another one of intermediate buses 128 in FIG. 5 are merged to form another aggregate buffer segment, such as 604. The merging is always possible if the buffers are sufficiently fast, which is true in general for small sized buffers, e.g., in a video environment in the order of a few kilobytes. This permits an implementation in a fast SRAM technology. Each of the aggregate buffer segments, such as 602 and 604, again is of the type including access control logic and tri-state output drivers (not shown here) as discussed above.

Sixth example

Figure 7:
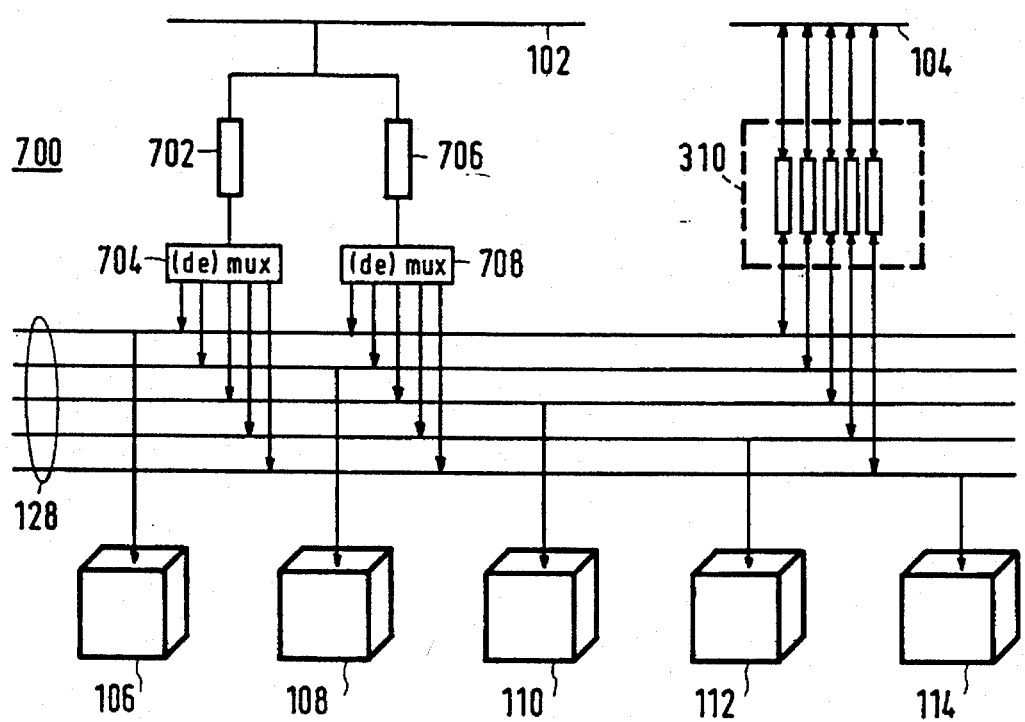

In above examples, the number of buffer segments, e.g., 206–214, per individual one of the buffer means, e.g., 118–126 is chosen equal to the number of intermediate buses 128 or to the number of processing elements 106–114. FIG. 7 gives an example of a system 700 with a hybrid architecture, merging the (de)multiplexer approach of system 100 of FIG. 1 with the formation of aggregate buffer segments as in system 600 in FIG. 6, showing that the number of buffer segments need not be equal to the number of processing elements. In system 700, I/O bus 102 is coupled to intermediate buses 128 through a cascade of a first buffer segment 702 and a first (de)multiplexer 704 and another cascade of a second buffer segment 706 and a second (de)multiplexer 708. In case the data flow between I/O buses 102 and 104 is uni-directional (de)multiplexers 704 and 708 can dispense with the multiplexing functionality.

Bi-directional buffer segments

Figure 8:
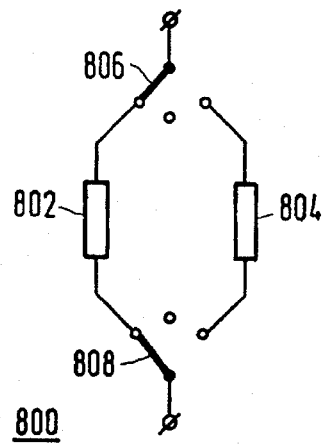
FIGS. 8–10 give examples of bi-directional buffer segments.
Figure 9:
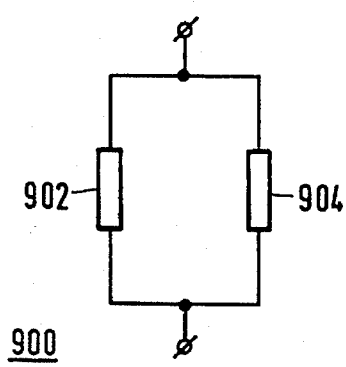
Figure 10:
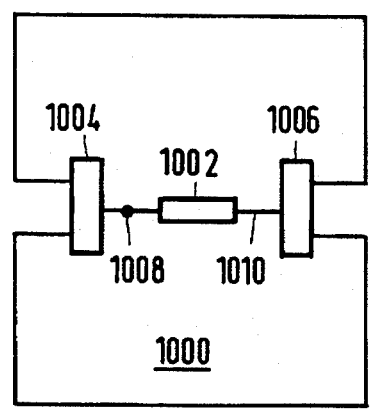

Bi-directional buffer segments can be implemented in a variety of ways. FIG. 8 gives an example of a bi-directional buffer segment 800 comprising a first uni-directional buffer 802 and a second uni-directional buffer 804 connected in an anti-parallel manner between first and second three-way switches 806 and 808. FIG. 9 illustrates another bi-directional buffer segment 900 comprising a first uni-directional buffer 902 and a second uni-directional buffer 904 connected in parallel. Buffers 902 and 904 have access control and tri-state outputs. FIG. 10 shows another bi-directional buffer segment 1000 comprising a single uni-directional buffer 1002 connected between a multiplexer 1004 and a demultiplexer 1006. Note that multiplexer 1004 can be replaced by two tri-state drivers (not shown) having their outputs connected to one another and to an input 1008 of buffer 1002, and that demultiplexer 1006 can be replaced by two tri-state drivers (not shown) having their outputs connected to one another and to an output 1010 of buffer 1002.

In the examples of the drawings, processing elements 106–114 can be memories, for use in, e.g., an image processing system to combine video data with computer generated graphics data in, e.g., a multi-media application. It is clear to the skilled person that the invention is neither restricted to the processing elements all being memories, nor to the processing elements being functionally uniform, nor to the application within image processing, nor to the processing of data supplied via specifically two buses. The processing system need not be bi-directional as in some of the examples discussed above.

For example, the concept of distributed buffer means 118–126, 302–310 and locally parallel buffer segments 206–214 can be advantageously used in, e.g., a computer, wherein respective ones of the processing elements 106–114 are operative to carry out computations, e.g., dyadic operations, on the data received from a single port via intermediate buses 128 and buffer means 118–126, 302–310, and to supply the results to further processing means via other than intermediate buses 128. Such a system then is uni-directional at least locally.

What is claimed is:

1. A data processing system comprising:

data port means;

a plurality of processing elements being operative to process sequential data and being coupled in parallel to the data port means;

control means coupled between the data port means and the processing elements for governing data communication;

characterized in that the control means comprises a further plurality of buffer means for providing data channels between the data port means and the processing elements, each respective one of the buffer means including a respective plurality of parallel buffer segments;

the control means is operative to selectively connect a single one of the buffer segments in respective ones of the buffer means to respective ones of the processing elements.

2. The system of claim 1, comprising a bus for connecting the buffer means in parallel to the data port means, and wherein the control means are operative to selectively connect the buffer segments to the bus.

3. The system of claim 2, wherein each memory unit includes a random access memory.

4. The system of claim 1, comprising first and second buses for transport of sequential data at a first rate and a second rate, respectively, between the data port means and at least a first one of the buffer means and a second one of the buffer means, respectively.

5. The system of claim 4, wherein the buffer segments of the first buffer means have a first depth, and the buffer segments of the second buffer means have a second depth, different from the first depth.

6. The system of claim 5, wherein the random access memory includes a page-mode DRAM.

7. The system of claim 1, wherein respective ones of the processing elements comprise a respective memory unit.

* * * * *